United States Patent [19]

Arends

[11] 4,218,169
[45] Aug. 19, 1980

[54] PORTABLE, SELF-UNLOADING FERTILIZER TENDER

[75] Inventor: Kenneth W. Arends, Willmar, Minn.

[73] Assignee: Waycrosse, Inc., Minnetonka, Minn.

[21] Appl. No.: 890,999

[22] Filed: Mar. 28, 1978

[51] Int. Cl.³ ............................................. B60P 1/40
[52] U.S. Cl. .................................... 414/523; 414/526
[58] Field of Search .................. 214/83.26, 83.32, 522, 214/17 D; 248/354 H, 354 P; 212/8 R; 198/538; 414/325, 504, 505, 523

[56] References Cited

U.S. PATENT DOCUMENTS

| | | | |
|---|---|---|---|
| 2,479,899 | 8/1949 | Beyer | 214/522 |
| 3,090,507 | 5/1963 | Gutekunst et al. | 214/17 D |
| 3,171,558 | 3/1965 | Sharp | 214/522 |

*Primary Examiner*—Robert G. Sheridan
*Attorney, Agent, or Firm*—Dorsey, Windhorst, Hannaford, Whitney & Halladay

[57] ABSTRACT

The portable, self-unloading fertilizer tender comprises a frame suitable for mounting on a truck or trailer for road and ground travel, a hopper mounted on the frame with a discharge opening at its bottom, a longitudinally extending auger tube in communication with the hopper, an auger mounted in the tube and support means for the tube. The discharge opening of the hopper is spaced longitudinally from at least one end of the frame, and the hopper end wall on that end of the frame slopes downwardly and inwardly toward the discharge opening. The entire auger tube is pivoted at its intake end about a transverse, horizontal axis adjacent the discharge opening of the hopper. The intake end has an opening in registration with the hopper discharge opening. The discharge end of the auger tube can be selectively adjusted in vertical elevation between a lowered, traveling position and at least one elevated, discharge position by support and retention means. The drive assembly for the auger includes a power shaft mounted for rotation on an axis extending longitudinally of the frame and a driving connection between the power shaft and the auger adapted to maintain a driving connection to the auger in its elevated position.

2 Claims, 3 Drawing Figures

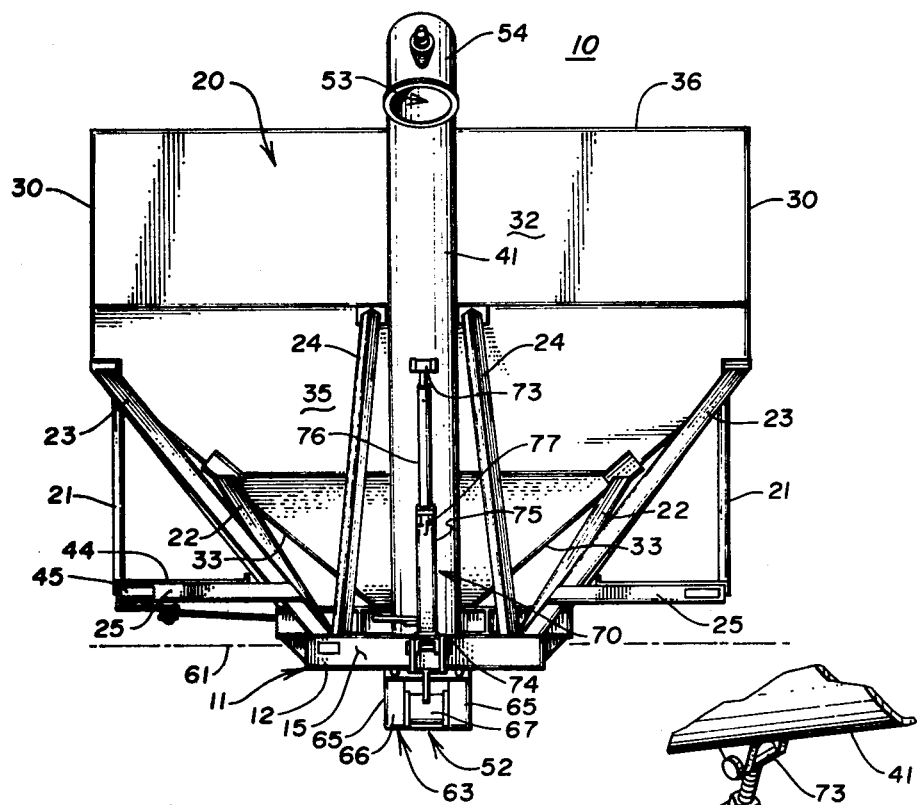

PORTABLE, SELF-UNLOADING FERTILIZER TENDER

BACKGROUND OF THE INVENTION

1. Field of the Invention

The present invention relates to a self-unloading vehicle and, more particularly, to a portable fertilizer tender with a selectively adjustable auger tube.

2. Description of the Prior Art

Among the devices used to transport granular fertilizer from a barn or warehouse to spreaders or to the field for storage is a truckmounted hopper with an associated discharge auger tube and auger contained therein that extend rearwardly and are upwardly inclined. The height of such an auger tube must be sufficient to reach over the sides of field spreaders, some of which are elevated a substantial distance from the ground. Fertilizer tenders using either a fixed auger tube or a folding auger tube are well-known in the field; however, neither type of device offers entirely satisfactory performance. Fixed auger devices may exceed the lawful height established for vehicles driven on highways and, occasionally, are too high to gain access to barns or warehouses. The folding auger tube employs a hinge several feet from the top end, which allows the top section of the auger tube to fold down or to the side. A set of drive pins and a wooden bushing are utilized in the hinge between the two sections of the auger screw. These pins are under constant stress and frequently bend or wear out. The bushing, which is used to keep the auger screw centered in the auger tube, is subject to excessive wear because of the continual flow of fertilizer in the auger tube. In addition, if a winch and cable assembly is employed to erect the auger tube, the cable tends to weaken, and thus become a maintenance problem, from the strain exerted on it by the weight of the auger screw and tube.

SUMMARY OF THE INVENTION

The portable, self-unloading fertilizer tender includes a longitudinally extending frame suitable for mounting on a truck or trailer for road or ground travel. A hopper with a discharge opening at its bottom is mounted upon the frame with the opening spaced longitudinally from at least one end of the frame. Either the front or rear end walls, or both, slope downwardly and inwardly from the one end of the frame toward the discharge opening.

Connected to the hopper is a longitudinally extending auger tube that has an intake end pivotally mounted adjacent the one end wall for vertical swinging movement of the tube between a lowered and an elevated position; the tube rotates beneath the one end wall about a transverse, horizontal pivot axis adjacent the hopper discharge opening with the intake end of the tube positioned adjacent the opening and having an intake opening in registration with the hopper discharge opening when the tube is in its elevated position. The other end of the auger tube is the discharge end, which extends outwardly from the transverse pivot axis to at least the one end of the frame. An auger is mounted for rotation in the auger tube and extends longitudinally thereof from the intake end of the discharge end of the tube. The tender also includes means for selectively supporting and retaining the auger tube in its lowered and elevated positions.

The invention further includes a drive assembly for connecting the auger to the power take-off shaft of a suitable towing vehicle at one end of the tender. Such a drive assembly to the auger preferably comprises a power shaft mounted for rotation on an axis extending longitudinally of the frame and a driving connection between the power shaft and the auger adapted to maintain a driving connection to the auger in its elevated position.

In its specific preferred form, the invention provides a tender in which the described features are arranged and located with the sloping end wall and auger tube at the rear end of the tender frame and with the power take-off connection at the front end.

The present invention minimizes or eliminates the previously mentioned problems that existed in the prior art. The position of the discharge end of the auger tube can be adjusted in elevation, thereby allowing the tender either to be driven on the highway or through a low barn door with the auger tube discharge end lowered to a traveling position that is within a legal or practical height above the ground or road, or to be used in the field with the discharge end raised to a position that is sufficiently high to fill high-hopper field spreaders. In addition, the simplified construction of the single, straight adjustable auger reduces the number of parts, manufacturing costs and maintenance requirements from those of the known folding auger tenders.

Other features and modifications of the invention will be apparent from the following detailed description and claims.

BRIEF DESCRIPTION OF THE DRAWINGS

In the drawings which form a part of this application, and in which like numerals refer to like parts:

FIG. 2 is a rear view of the tender; and

FIG. 3 is a perspective view of the hydraulic jack assembly.

DESCRIPTION OF THE PREFERRED EMBODIMENT

Figure 1:
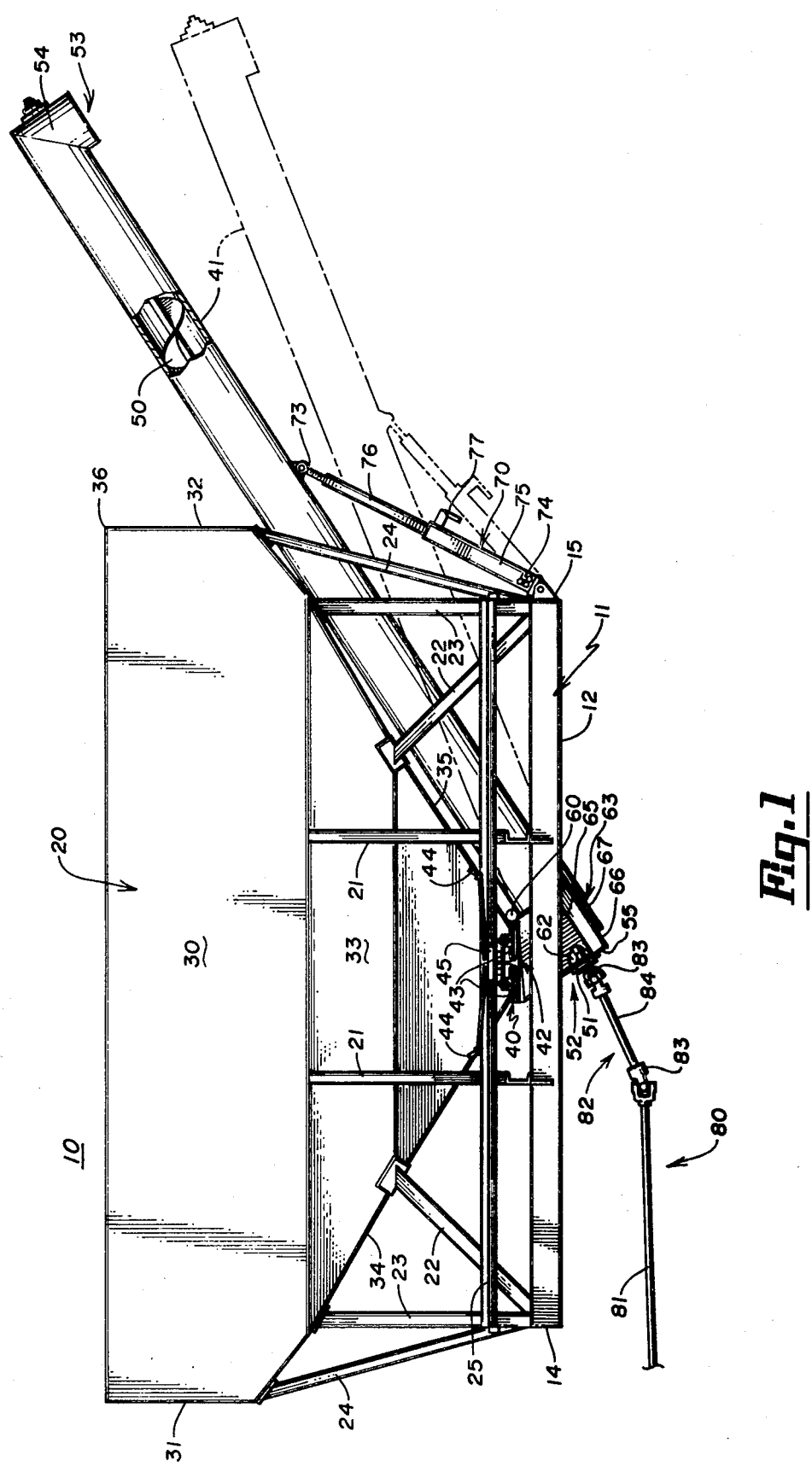
FIG. 1 is a side view of the portable, self-unloading fertilizer tender.

FIGS. 1 and 2 of the drawings illustrate a portable, self-unloading fertilizer tender 10 made in accordance with and embodying the principles of the present invention. The tender 10 includes a longitudinally extending frame 11 that is suitable for mounting on a truck or trailer for road or ground travel. The frame comprises the base 12 and has front and rear ends 14 and 15, respectively.

The hopper 20 is supported on the frame 11 by the longitudinally spaced, vertical uprights 21, the diagonal support members 22, the corner support members 23, and the end support members 24. Secured to the corner support members 23 is the laterally extending support structure 25. The upper side walls 30 of the hopper are parallel to each other, as are the upper front and upper rear walls 31 and 32 in order to maximize the volumetric capacity of the hopper. The lower side walls 33 and lower front and lower rear walls 34 and 35 converge downwardly to the hopper discharge opening 40, which is spaced longitudinally from the rear end 15 of the frame 11. Obviously, other hopper configurations are feasible; only the wall adjacent the auger tube 41 must converge to the discharge opening 40.

Fixed to the hopper discharge opening 40 is the hopper gate assembly 42. The gate assembly 42 comprises the gates 43, gate arms 44 and gate bracket 45; the bracket 45 is secured to the support structure 25.

The one-piece, longitudinally extending auger tube 41 contains the auger 50. The auger 50 has a shaft 51 that is mounted for rotation in the auger tube 41 and extends longitudinally thereof from the intake end 52 of the auger tube 41 to its discharge end 53. The shaft 51 at the discharge end 53 is journaled in the discharge hood 54 and at the intake end 52 is journaled in the auger box end plate 55.

The intake end 52 of the auger tube 41 is pivotally mounted in the bracket 60 adjacent, and preferably on, the lower rear wall 35 for vertical swinging movement of the auger tube 41 beneath the rear wall 35 about a transverse, horizontal pivot axis 61 adjacent the discharge opening 40. The intake end 52 is positioned adjacent the hopper discharge opening 40 and has an intake opening 62 in registration with the hopper discharge opening 40. The juncture between the discharge opening 40 and intake opening 62 is enclosed by the auger box 63. The auger box 63 comprises two pairs of vertical plates—the discharge opening plates (not shown), which depend from the gate assembly 42, and the intake end plates 65, which project upward and move slidably over the discharge opening plates—the auger box end plate 55 and the auger box bottom 66. A slidably mounted auger box door 67 is located on the bottom 66 of the auger box 63. The design of the auger box 63 prevents the loss of fertilizer during its transfer from the hopper 20 to the auger 50.

The discharge end 53 of the auger tube 41 extends rearwardly from the transverse, horizontal pivot axis 61 to at least the rear end 15 of the frame 11. The tube 41 can be swung between a lowered, traveling position (shown in the dashed lines in FIG. 1) in which the tube 41 is within the vertical road clearance of the hopper 20, and elevated positions (one of which is shown by the solid lines in FIG. 1) in which the discharge end 53 extends beyond and higher than the edge 36 of the upper rear wall 32 when the auger tube 41 is positioned closely adjacent the wall 35. The vertical road clearance is approximated by the elevation of the rear wall top edge 36.

The means for selectively supporting and retaining the auger tube 41 in its lowered and each of its elevated positions preferably comprises a manually operated, hydraulic jack assembly 70, although a mechanical jack or screw, or a winch and cable could also be used. As shown in FIG. 3, the assembly 70 comprises a cylinder member 71, a piston (not shown) slidably mounted in the cylinder member 71 and having a piston rod member 72 projecting therefrom. The cylinder member 71 has a lower end 74 pivotally mounted at the rear end 15 of the frame 11. The piston rod member 72 has an upper end 73 pivotally connected to the auger tube 41. The cylinder member 71 and piston rod 72 are enclosed in the lower support frame 75 and the upper support frame 76. Frame 76 is slidably mounted in frame 75. One or more holes are drilled in the upper support frame 76; a single hole is drilled in the lower support frame 75. To secure the auger tube 41, a spring-loaded stop pin 77 is released into the hole in the lower support frame 75 and one of the holes in the upper support frame 76.

The hydraulic jack assembly 70 is of a conventional type. It is activated with a manually operated pump connected to a first jack handle. Internal, one-way valves permit the build-up of pressure when the first jack handle is used. The hydraulic fluid pressure is relieved with a standard bleed valve that is connected to a second jack handle.

The auger 50 is driven by the drive assembly 80, which comprises a power shaft 81 mounted for rotation on an axis extending longitudinally of the frame 11 and having a power take-off connection at its forward end for a truck or similar vehicle, and a universal shaft 82 connecting the auger 50 and the auger shaft 51. The universal shaft 82 includes two universal couplings 83 and a telescoping, intermediate shaft 84.

During road or ground travel, the auger tube 41 is maintained in its lowered position, resting on the hydraulic jack assembly cylinder member 71. The auger tube 41 is secured in its lowered position by the stop pin 77, which passes through both the support frame 75 and the hole 78 of the support frame 76. Use of the stop pin 77 prevents the auger tube 41 from bouncing while the tender is being transported. With the auger tube 41 in its lowered position, the discharge end 53 of the auger tube 41 is within the available vertical road clearance as well as the available clearance for the warehouses or barns in which it is used.

To discharge the contents of the hopper 20, the stop pin 77 is withdrawn from the support frames 75 and 76, after which the discharge end 53 of the tube 41 is raised vertically to the desired elevation by the manually operated hydraulic jack 70. The tube 41 is secured in the elevated position by releasing the stop pin 77 when it is opposite a hole in the upper support frame 76. The stop pin 77 prevents the auger tube 41 from falling should a failure of the hydraulic jack assembly 70 occur. Regardless of the position of the tube 41, the auger 50 is in driving connection with the drive assembly 80. The power supplied from a power take-off will drive the auger 50 during the discharge operation. The flow of fertilizer into the auger box 63 is governed by the gate assembly 42. The gates 43 are opened by pulling the gate arms 44 outwardly, thereby allowing the contents of the hopper 20 to flow freely into the auger box 63 and to be carried by the auger 50 upwardly and out of the discharge end 53.

Although the preferred embodiment has been described in detail, it is contemplated that various modifications could be made to the structure of the preferred embodiment by those skilled in the art without deviating from the spirit or scope of the present invention. For example, the auger tube 41 could be pivotally mounted on the lower front wall 34 of the hopper 20 with the hydraulic jack assembly 70 mounted on the front end 14 of the frame 11. With the auger tube 41 either forwardly or rearwardly directed, it could be pivotally mounted on a bracket extending upwardly from the frame 11, rather than on the end wall. The hopper 20 need not be of the gravity-flow type, it could have means for directing its contents downwardly toward the discharge opening 40. Finally, the tender is suitable for transporting materials other than fertilizer that can be discharged by an auger. Accordingly, the scope of the present invention should not be dictated by the description of the preferred embodiment.

I claim:

1. A portable, self-unloading fertilizer tender suitable for mounting on a truck or trailer for road or ground travel, which comprises:

a. a longitudinally extending frame having front and rear ends;

b. a hopper mounted upon said frame, said hopper having (1) a discharge opening at the bottom thereof at a location spaced longitudinally from at least one end of the frame, and (2) front and rear end walls, one of said end walls sloping downwardly and inwardly from said one end of the frame toward said discharge opening;

c. a longitudinally extending auger tube having (1) an intake end pivotally mounted adjacent said one end wall for vertical swinging movement of said tube between a lowered and an elevated position, said tube rotating beneath said one end wall about a transverse, horizontal pivot axis adjacent said discharge opening with said intake end positioned adjacent said hopper discharge opening and having an intake opening in registration with said hopper discharge opening in said elevated position, and (2) a discharge end extending outwardly from the transverse pivot axis to at least said one end of the frame;

d. an auger mounted for rotation in said auger tube and extending longitudinally thereof from said intake end to said discharge end, said auger including a coaxial auger shaft; and e. means including a hydraulic jack assembly for selectively supporting and retaining said auger tube in said lowered and elevated positions, said jack assembly comprising (1) a cylinder member having a piston slidably mounted therein;

(2) a piston rod member projecting from said piston;

(3) a lower support frame and an upper support frame slidably mounted therein which enclose said cylinder member and piston rod member, each of said support frames having one or more holes drilled therein, said lower support frame being pivotally connected to said one end of the frame and said upper support frame being pivotally connected to said auger tube, (4) a spring-loaded stop pin mounted on said lower support frame so that when a hole in said upper support frame and a hole in said lower support frame are aligned, said stop pin will be forced through both of said holes; and (5) the pivotal connections of the lower and upper support frames effectively pivotally mounting the lower end of the cylinder member at said one end of the longitudinally extending frame and pivotally connecting the piston rod member to said auger tube.

2. A portable self-unloading fertilizer tender comprising:

a. a longitudinally extending, wheel-mounted frame suitable for road or ground travel along a desired longitudinal path and having front and rear ends;

b. a hopper mounted upon said frame, said hopper having (1) a discharge opening at the bottom thereof, at a location spaced longitudinally and forwardly from the rear end of the frame, and (2) a rear wall that slopes downwardly and forwardly from said rear end of the frame toward said discharge opening;

c. a longitudinally extending auger tube having (1) a discharge end extending rearwardly from said discharge opening to at least said rear end of the frame, and (2) an intake end pivotally mounted on said rear wall for vertical swinging movement of said tube between a lowered position in which the entire tube is within the vertical road clearance of said hopper and an elevated position in which said discharge end extends beyond and higher than said hopper with the auger tube positioned closely adjacent said rear wall, said intake end positioned adjacent said hopper discharge opening and having an intake opening in registration with said hopper discharge opening in said elevated position;

d. a one-piece auger mounted for rotation in said auger tube and extending longitudinally thereof from said intake end to said discharge end, said auger including a coaxial auger shaft;

e. means for selectively supporting and retaining said auger tube in said lowered and elevated positions, said means including a hydraulic jack assembly; and f. a drive assembly comprising (1) a power shaft mounted for rotation on an axis extending longitudinally of the frame and having a power take-off connection at its forward end, and (2) a universal shaft connecting said auger shaft and power shaft.

* * * * *